(12) United States Patent
Kanter et al.

(10) Patent No.: US 7,603,367 B1
(45) Date of Patent: Oct. 13, 2009

(54) METHOD AND SYSTEM FOR DISPLAYING ATTRIBUTES OF ITEMS ORGANIZED IN A SEARCHABLE HIERARCHICAL STRUCTURE

(75) Inventors: Max L. Kanter, Seattle, WA (US); Todd A. Heimes, Seattle, WA (US); J. Nathaniel Sloan, Issaquah, WA (US); Michael Paul Touloumtzis, Seattle, WA (US); Michael L. Weiss, Maple Valley, WA (US)

(73) Assignee: Amazon Technologies, Inc., Reno, NV (US)

( * ) Notice: Subject to any disclaimer, the term of this patent is extended or adjusted under 35 U.S.C. 154(b) by 224 days.

(21) Appl. No.: 11/540,933

(22) Filed: Sep. 29, 2006

(51) Int. Cl.
*G06F 17/00* (2006.01)
*G06F 17/30* (2006.01)
*G06F 7/00* (2006.01)

(52) U.S. Cl. .................. 707/100; 707/3; 707/5
(58) Field of Classification Search ............ 707/3, 707/5, 100
See application file for complete search history.

(56) References Cited

U.S. PATENT DOCUMENTS

| 2005/0138022 A1 | 6/2005 | Bailey |
| 2006/0085766 A1* | 4/2006 | Dominowska et al. ...... 715/854 |
| 2006/0277203 A1* | 12/2006 | Uittenbogaard ............. 707/100 |

* cited by examiner

*Primary Examiner*—James Trujillo
*Assistant Examiner*—Bruce M Moser
(74) *Attorney, Agent, or Firm*—Christensen O'Connor Johnson Kindness PLLC

(57) ABSTRACT

A catalog or database of items capable of being searched may be organized into a browse tree structure. In accordance with aspects of the present invention, attributes that describe and are common to the items in each category can be assigned or associated with the browse node for the category. Such "browse node attributes" may be displayed with their respective associated item category. Accordingly, as a user searches the browse tree and or narrows his/her search to more specific item categories in a browse tree, the attributes corresponding to the more specific item categories can then be displayed as a superset of the attributes corresponding to a less specific category. Furthermore, the arrangement of attributes displayed to the user can be customized according to user preferences, clickstream analysis, or other techniques and the user may select which attributes are to be displayed.

36 Claims, 12 Drawing Sheets

Industrial & Scientific > Fasteners > Screws
Metric Screws

| Narrow or Expand Results | Showing 1 – 7 of 900 Results | Sort by | Featured Items ▼ | GO |

Expand Your Results
Remove Category: Screws
Remove System of Measurement: Metric

Narrow by Category
Cap Screws (93)
Machine Screws (759)
Set Screws (48)

Narrow by Material
Plastics & Rubber (222) ☐

Narrow by Head Style
Cheese (237) ☐
Fillister (21) ☐
Flat (147) ☐
Oval (144) ☐
Pan (210) ☐
Set Screw (48) ☐
Standard Socket Cap (93) ☐

Narrow by Thread Pitch
1.25 (87) ☐
1.00 (150) ☐
0.7 (120) ☐
0.4 (35) ☐

Narrow by Size
M6 (176) ☐
M5 (157) ☐
M4 (130) ☐
M2.5 (118) ☐
M3 (114) ☐
M8 (90) ☐
M2 (82) ☐
M.8 (9) ☐
M1.4 (6) ☐
M1 (6) ☐
M.5 (6) ☐
M.9 (3) ☐

Narrow by Price
$0–$24 (787) ☐
$25–$49 (72) ☐
$50–$99 (17) ☐

See Only
Product Name ☒
Size ☒
Overall Length ☒
Head Style ☒
Thread Pitch ☒
Price ☒

| Product Name | Size | Overall Length | Head Style | Thread Pitch | Price |
|---|---|---|---|---|---|
| Stainless Steel Set Screw Metric Hex Socket Cup Point M8-1.25 x 16mm Length DIN 916 (Pack of 10) | M8 | 16 mm | Set Screw | 1.25 | $5.80 |
| Stainless Steel 18-8 Metric Socket Head Cap Machine Screw M6-1.00 x 40 mm L (Pack of 10) | M6 | 40 mm | Std. Socket Cap | 1.00 | $3.05 |
| Stainless Steel 18-8 Metric Phillips Flat Head Machine Screw IFI M4.-0.7 x 25 mm L (Pack of 25) | M4 | 25 mm | Flat | 0.7 | $3.25 |
| Nylon Cheese Head Slotted Machine Screw Metric M2-0.4 x 4mm Length DIN 84 (Pack of 25) | M2 | 4 mm | Cheese | 0.4 | $1.60 |
| Stainless Steel 18-8 Metric Slotted Cheese Head Machine Screw M2-0.40 x 6mm L (Pack of 25) | M2 | 6 mm | Cheese | 0.4 | $1.20 |
| Nylon Cheese Head Slotted Machine Screw Metric M2-0.4 x 12mm Length DIN 84 (Pack of 1000) | M2 | 12 mm | Cheese | 0.4 | $47.25 |
| Nylon Cheese Head Slotted Machine Screw Metric M2-0.4 x 25mm Length DIN 84 (Pack of 100) | M2 | 25 mm | Cheese | 0.4 | $5.80 |

1 – 7 of 15255
Page: [1] 2 3 4 5 6 7 8 … Next >

*Fig. 9.*

Industrial & Scientific > Fasteners > Screws
Metric Screws

| Narrow or Expand Results | Showing 1 – 24 of 147 Results | Sort by | Featured Items ▼ | GO |

Expand Your Results
Remove Category: Screws
Remove System of Measurement: Metric

Narrow by Category
Cap Screws (93)
Machine Screws (759)
Set Screws (48)

Narrow by Material
Plastics & Rubber (222) ☐

Narrow by Head Style
Cheese (237) ☐
Fillister (21) ☐
Flat (147) ☒
Oval (144) ☐
Pan (210) ☐
Set Screw (48) ☐
Standard Socket Cap (93) ☐

Narrow by Thread Pitch
1.25 (87) ☐
1.00 (150) ☐
0.7 (120) ☐
0.4 (35) ☐

Narrow by Size
M6 (176) ☐
M5 (157) ☐
M4 (130) ☐
M2.5 (118) ☐
M3 (114) ☐
M8 (90) ☐
M2 (82) ☐
M.8 (9) ☐
M1.4 (6) ☐
M1 (6) ☐
M.5 (6) ☐
M.9 (3) ☐

Narrow by Price
$0-$24 (787) ☐
$25-$49 (72) ☐
$50-$99 (17) ☐

Narrow by Drive Style
Philips (105) ☐
Slotted (42) ☐

See Only
Product Name ☒
Size ☒
Overall Length ☒
Head Style ☒
Thread Pitch ☒
Price ☒

| Product Name | Size | Overall Length | Drive Style | Thread Pitch | Price |
|---|---|---|---|---|---|
| Stainless Steel 18-8 Metric Philips Flat Head Machine Screw IFI M2.5 - 0.45 x 6mm L (Pack of 100) | M2.5 | 6 mm | Phillips | 0.45 | $4.05 |
| Stainless Steel 18-8 Metric Philips Flat Head Machine Screw IFI M8 - 1.25 x 20mm Length (Pack of 10) | M8 | 20 mm | Phillips | 1.25 | $3.80 |
| Stainless Steel 18-8 Metric Phillips Flat Head Machine Screw IFI M4.- 0.7 x 40 mm Length (Pack of 25) | M4 | 40 mm | Phillips | 0.7 | $4.80 |
| Stainless Steel 18-8 Metric Phillips Flat Head Machine Screw IFI M4.- 0.7 x 12 mm Length (Pack of 10) | M4 | 12 mm | Phillips | 0.7 | $1.35 |
| Stainless Steel 18-8 Metric Phillips Flat Head Machine Screw M2 - 0.40 x 25mm Length (Pack of 25) | M4 | 25 mm | Slotted | 0.7 | $3.25 |
| Stainless Steel 18-8 Metric Slotted Cheese Head Machine Screw M2 - 0.40 x 10mm Length (Pack of 100) | M2 | 10 mm | Phillips | 0.4 | $5.10 |
| Stainless Steel 18-8 Metric Phillips Flat Head Machine Screw M2 - 0.40 x 10mm Length (Pack of 25) | M2 | 10 mm | Slotted | 0.4 | $1.55 |

1 – 7 of 15255

Page: [1] 2 3 4 5 6 7 8 ... Next >

METHOD AND SYSTEM FOR DISPLAYING ATTRIBUTES OF ITEMS ORGANIZED IN A SEARCHABLE HIERARCHICAL STRUCTURE

FIELD OF THE INVENTION

The present invention is generally directed to systems and methods that display items organized in a hierarchical structure and information common to such items.

BACKGROUND

In a typical network-based merchandising environment, a user can search for items (i.e., goods and/or services) within a category or group of items in an electronic item catalog. A catalog of items (including each item's description) may be organized into a browse tree structure in order to facilitate searching. As the name suggests, a "browse" tree permits users to "browse" through various items, which are logically arranged in the form of a hierarchical tree. Each node of the browse tree (a.k.a., a "browse node") may be associated with a category of items in a hierarchical manner. Moreover, the browse tree may be displayed via a user interface as a collection of hyperlinks, each hyperlink corresponding and providing further access to a browse node of the tree. For example, the "root" node of a tree representing "all items" has many browse nodes corresponding to categories such as "Books," "Electronics," "Tools and Automotive," etc. Each such browse node may have different child browse nodes representing sub-categories. For example, a parent browse node such as "Tools and Automotive" may have a number of child browse nodes such as "Industrial & Scientific," "Tools & Hardware," etc. Accordingly, to find an item within the "Tools and Automotive" category, a user may select a hyperlink associated with the child browse node "Industrial & Scientific." Selecting "Industrial & Scientific" will display a list of further child browse nodes representing sub-categories including "Fasteners." In turn, selecting "Fasteners" will display a list of further child browse nodes representing sub-categories of "Fasteners" including "Screws." Finally, selecting "Screws" will display a list of actual Industrial & Scientific devices (i.e., "leaves"), which are available for purchase and are all related to "Screws." In this manner, a user can search through a browse tree and locate specific items of interest. However, if the user is interested in additional attributes regarding a specific item or category of items, such as "Size," or "Drive Style," the user must review each item and its associated record or detail page individually for the desired attribute. Such review may be difficult since current network-based merchandising systems are typically deficient in displaying attributes such that a user can easily find them.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with embodiments of the invention, a system is provided for displaying items, e.g., items stored in an electronic catalog for possible purchase, and relevant information regarding such items. For example, a system is disclosed that includes a data store storing a plurality of items categorized into nodes. The nodes are arranged into a hierarchical structure. For a first node in the hierarchical structure, an attribute common to the items categorized in the first node is associated with the first node. The system further includes a computing device for obtaining the attribute from the data store upon selection of the first node and generating information for displaying each item categorized in the first node with the attribute common to the items categorized in the first node (which information may subsequently be used to display each item). Accordingly, a user may view attributes associated with an item upon selection of a node in which the item is categorized rather than viewing each item and its associated record or detail page individually for attributes. Moreover, the display of the attributes upon selection of a node can be customized according to user preferences, clickstream analysis, or other techniques.

Methods and a computer-readable medium having computer-executable components for displaying items categorized into a hierarchy of nodes that are generally consistent with the system described above are also disclosed.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 9 is a pictorial diagram of a user interface display including a browse menu and an arrangement of attributes corresponding to a "Metric Screws" browse node;

FIG. 10 is a pictorial diagram of a user interface display including a browse menu and an arrangement of attributes presented upon selection of a particular "Head Style" attribute shown in FIG. 9.

DETAILED DESCRIPTION

As noted above, a catalog or database of items capable of being searched may be organized into a browse tree structure. In accordance with aspects of the present invention, attributes that describe and are common to the items in each category can be assigned or associated with the browse node for the category. As will be described in more detail below, such "browse node attributes" may be displayed with their associated item category. Accordingly, as a user searches the browse tree and or narrows his/her search to more specific item categories in a browse tree, the attributes corresponding to the more specific item categories can then be displayed as a superset of the attributes corresponding to a less specific category. Furthermore, the arrangement of attributes displayed to the user can be customized according to user preferences, clickstream analysis, or other techniques.

Figure 1:
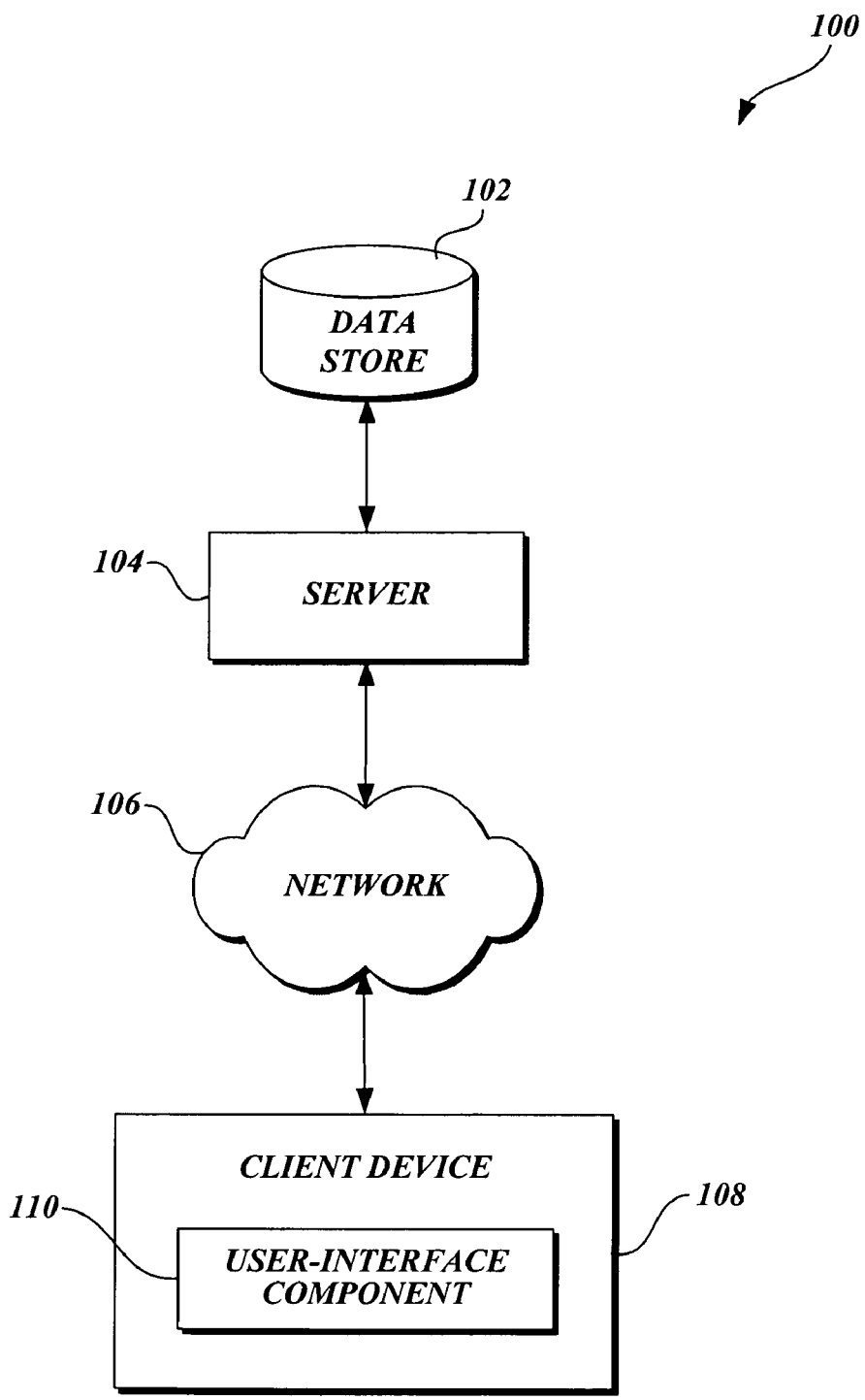
FIG. 1 is a block diagram of an illustrative operating environment formed in accordance with an aspect of the present invention including a data store, a server, and a client device.

With reference now to FIG. 1, an illustrative operating environment 100 is shown including a server 104 for retrieving browse node attributes from a data store 102 in response to a request received from at least one client device 108 via a network 106. Those skilled in the art will recognize that more than one client device 108 may communicate with the server 104 and that the client device 108 may be any of a number of computing devices that are capable of communicating over a network, including, but not limited to, set-top boxes, personal digital assistants, mobile phones, digital media players, Web pads, tablets, laptop computers, desktop computers, electronic book readers, etc. Protocols and components for providing communication between the client device 108 and the server 104 via the network 106 are well known to those skilled in the art of computer communications and thus, need not be described in more detail herein.

In one embodiment, a catalog of items organized as one or more browse trees is stored in the data store 102. Those skilled in the art will recognize that data store 102 may comprise one or more data stores located locally or remotely relative to the server 104. In addition, those skilled in the art will recognize that if more than one browse tree is stored, the browse trees may be interconnected and/or overlapping. Accordingly, a user browsing in one tree may browse to another without significant interruption. In addition to the browse tree, the data store 102 stores the browse node attribute data associated with each browse node of the browse tree. As noted above, the browse node attributes can be used to describe and/or identify a quality of items that fall into a certain category associated with the browse node. In addition, the attributes associated with a browse node are typically common to all or a substantial portion of the items that fall within the browse node. In one embodiment, a subject-matter expert creates the browse node attribute data associated with each browse node. In yet other embodiments, attributes are automatically or algorithmically determined and associated with each browse node.

In the illustrated embodiment, a user may request data from the data store 102 via a user-interface component 110 implemented by the client device 108. In one embodiment, the user-interface component 110 represents the front-end of a stand-alone application, such as a Web browser. Alternatively, the user-interface component 110 can be integrated with one or more software applications. For example, the user-interface component 110 could be integrated into a customized purchasing system such that potential purchasers are able to view item attributes before making a purchase of an item.

One skilled in the relevant art will appreciate that the data and/or components described above may be stored on a computer-readable medium and loaded into memory of the client device 108 or server 104 using a drive mechanism associated with the computer-readable medium, such as a floppy, CD-ROM, DVD-ROM drive, or network interface. Further, the components can be included on a single device or distributed in any manner. For example, all components could be located on the client device 108. Furthermore, the components shown in FIG. 1 represent an illustrative embodiment. In other embodiments, components can be removed or their functionality can be provided by another component. For example, the server component 104 and user-interface component 110 may be removed or their functionality could be provided by another component.

Figure 2A:
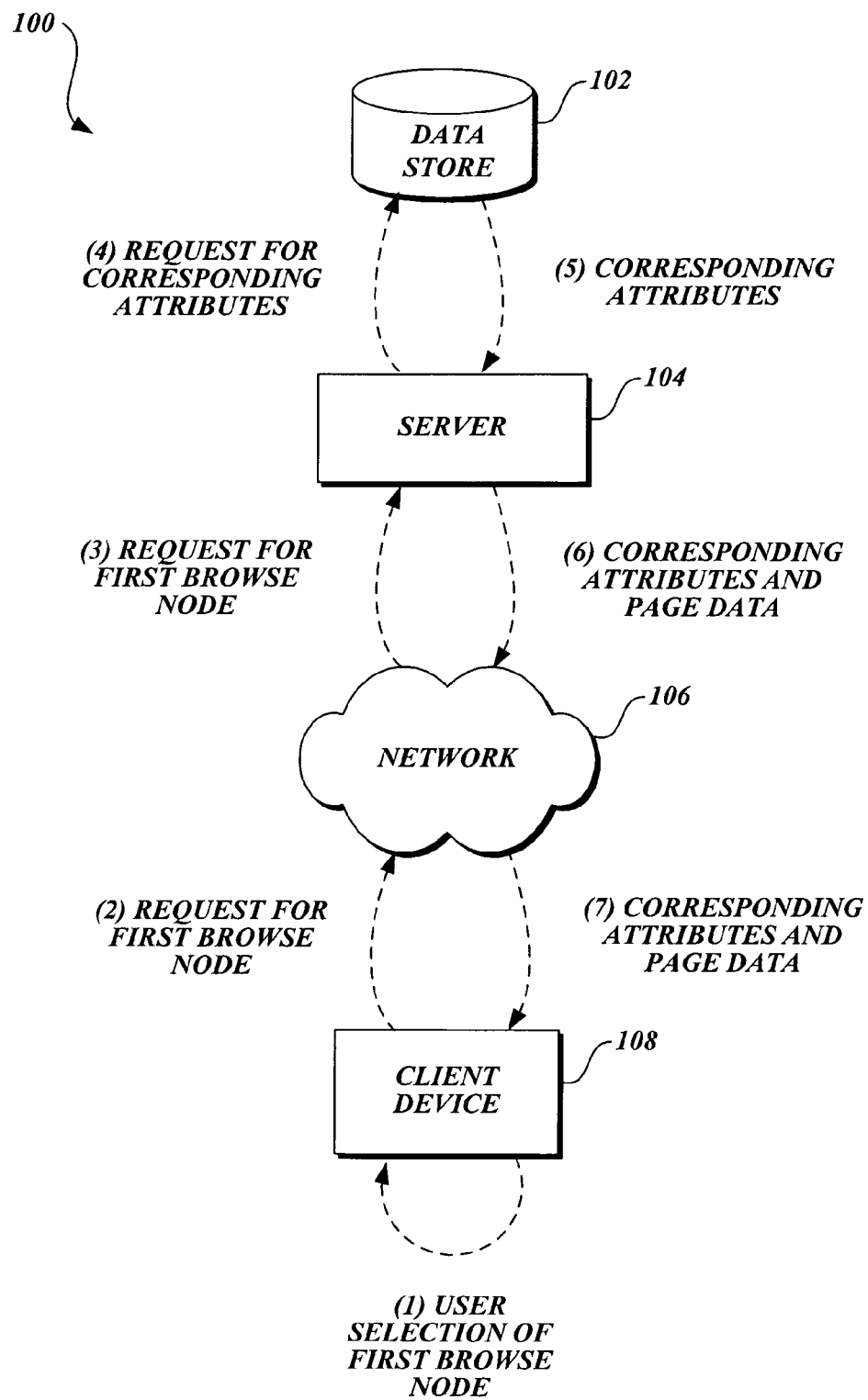
FIG. 2A is a block diagram a client device request for a first browse node and corresponding attributes from the server and data store shown in FIG. 1.

With reference now to FIG. 2A, the interaction by various components of the operating environment 100 to display browse node attributes corresponding to a first browse node of a browse tree will be described. As illustrated in FIG. 2A, browse nodes of a browse tree may be made accessible to a user via a user interface, such as a Web page, retrieved from the server 104 and displayed by the user-interface component 110 of the client device 108. Accordingly, each browse node may be displayed and accessed as a hyperlink on a Web page. Therefore, a user in search of an item of a particular type or category may select a first browse node associated with the category within which the item falls by clicking a hyperlink within the Web page. In response, the client device 108 issues a request for the first browse node. The request for the first browse node can be transmitted to the server 104 via a communications network 106, such as the Internet. The server 104 receives the request and issues a query to the data store 102 for data regarding the items categorized in the first browse node including the attributes which correspond to the first browse node. It will be appreciated by those skilled in the art, that one or more attributes (which one or more attributes may be referred to as "set" of attributes) may correspond to a browse node and that some browse nodes may not be associated with any attributes.

Figure 6:
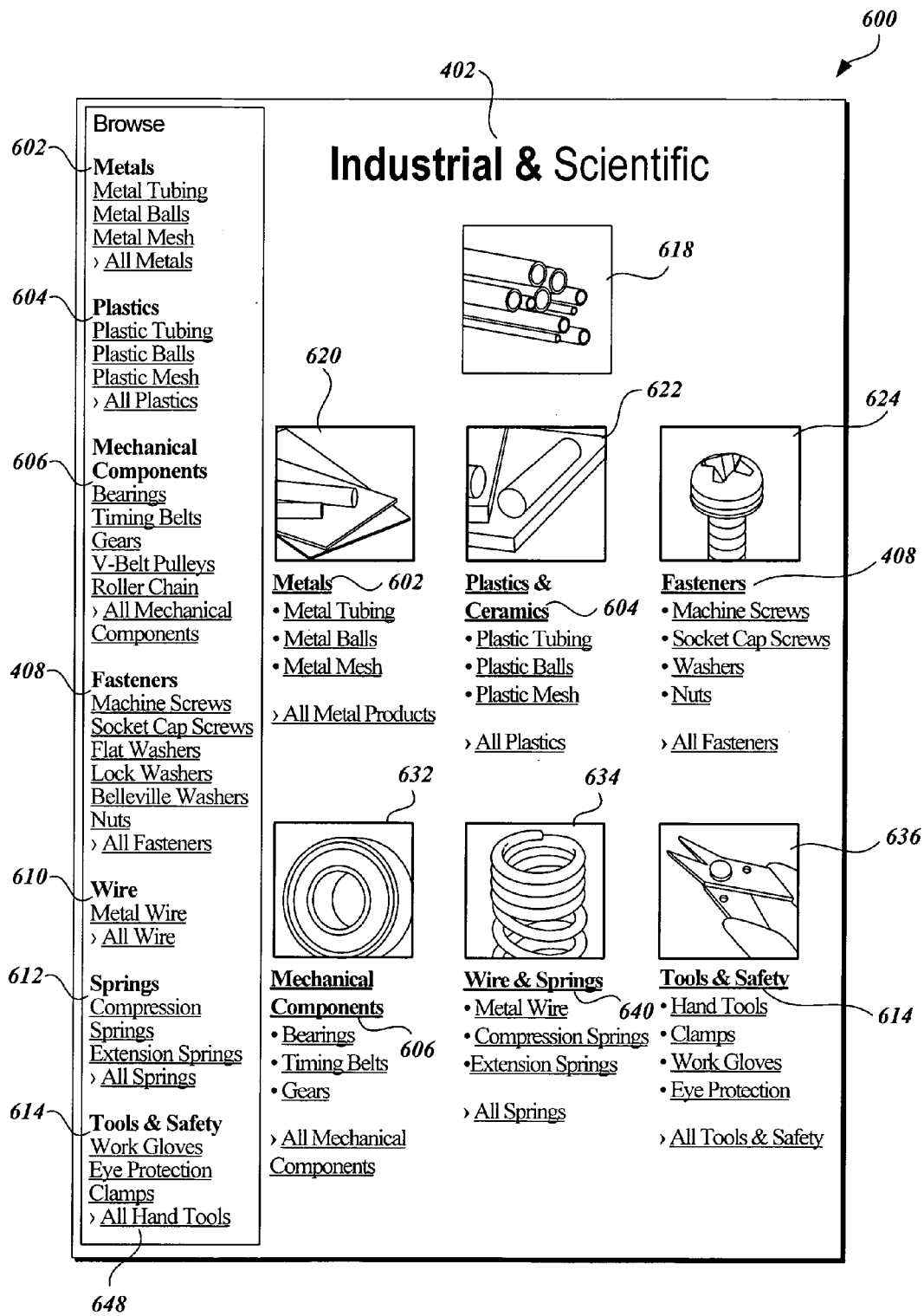
FIG. 6 is a pictorial diagram of a sample user interface display formed in accordance with an aspect of the present invention including a browse menu and a display area for displaying several item categories.

For example, and with reference to FIG. 6, the user may have selected a browse node for the "Fasteners" item category by clicking the hyperlink associated with the "Fasteners" browse node 408 in Web page 600. In response, the server issues a query to the data store 102 for data regarding the items categorized in the "Fasteners" browse node, including the attributes corresponding to the "Fasteners" browse node. In response to the request, the data store 102 provides the data including the corresponding attributes to the server 104. As discussed in more detail below, the browse node attributes can be customized for display according to clickstream analysis, other learning techniques, and/or user or group preferences. This customization can be performed by the server 104 or by code on the client device 108. For example, a service running on the server or a script on the client device 108 could customize the browse node attributes. Once the server 104 obtains the attributes corresponding to the first browse node from the data store 102, the server 104 transmits the data regarding the items in the first browse node, including the attributes corresponding to the first browse node, to the client device 108 via the communications network 106. The user-interface component 110 of the client device 108 processes the data to construct a user interface, such as a Web page, that displays the items categorized in the selected browse node and the associated browse node attributes. Such a Web page is illustrated in FIG. 7, which will be described in more detail below.

Figure 2B:
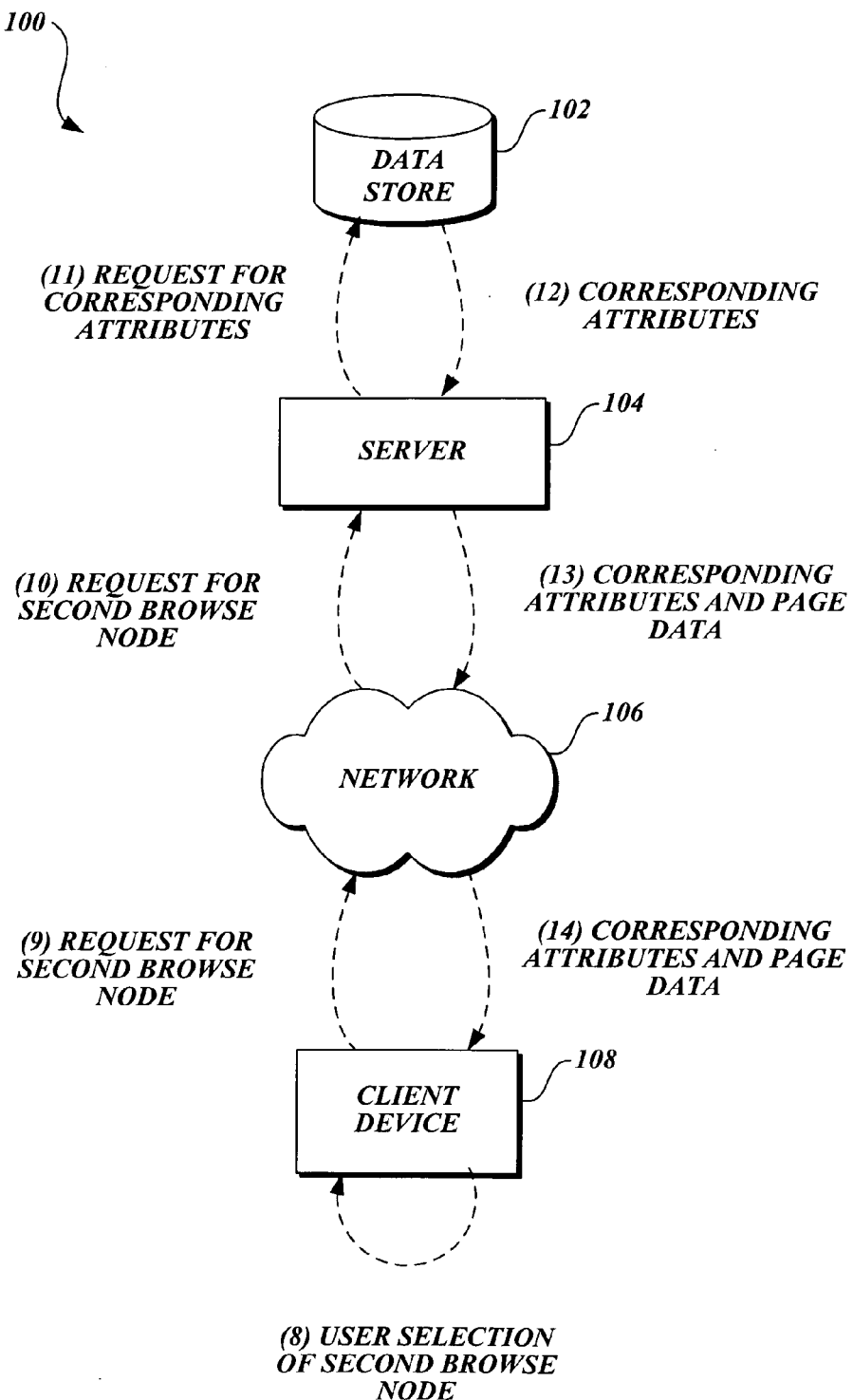
FIG. 2B is a block diagram of a client device request for a second browse node and corresponding attributes from the server and data store shown in FIG. 1.

With reference now to FIG. 2B, the interaction by various components of the operating environment 100 to provide browse node attributes corresponding to a second browse node that is a child node of the first browse node will be described. As illustrated in FIG. 2B, a user may select a second browse node associated with a sub-category of items. For example, the second browse node could be selected by clicking its associated hyperlink on a Web page displaying the items categorized in the first browse node. In response, the client device 108 issues a request for the second browse node via the communications network 106. The server 104 receives the request and issues a query to the data store 102 for data regarding the items categorized in the second browse node, including the attributes which correspond to the second browse node.

Figure 7:
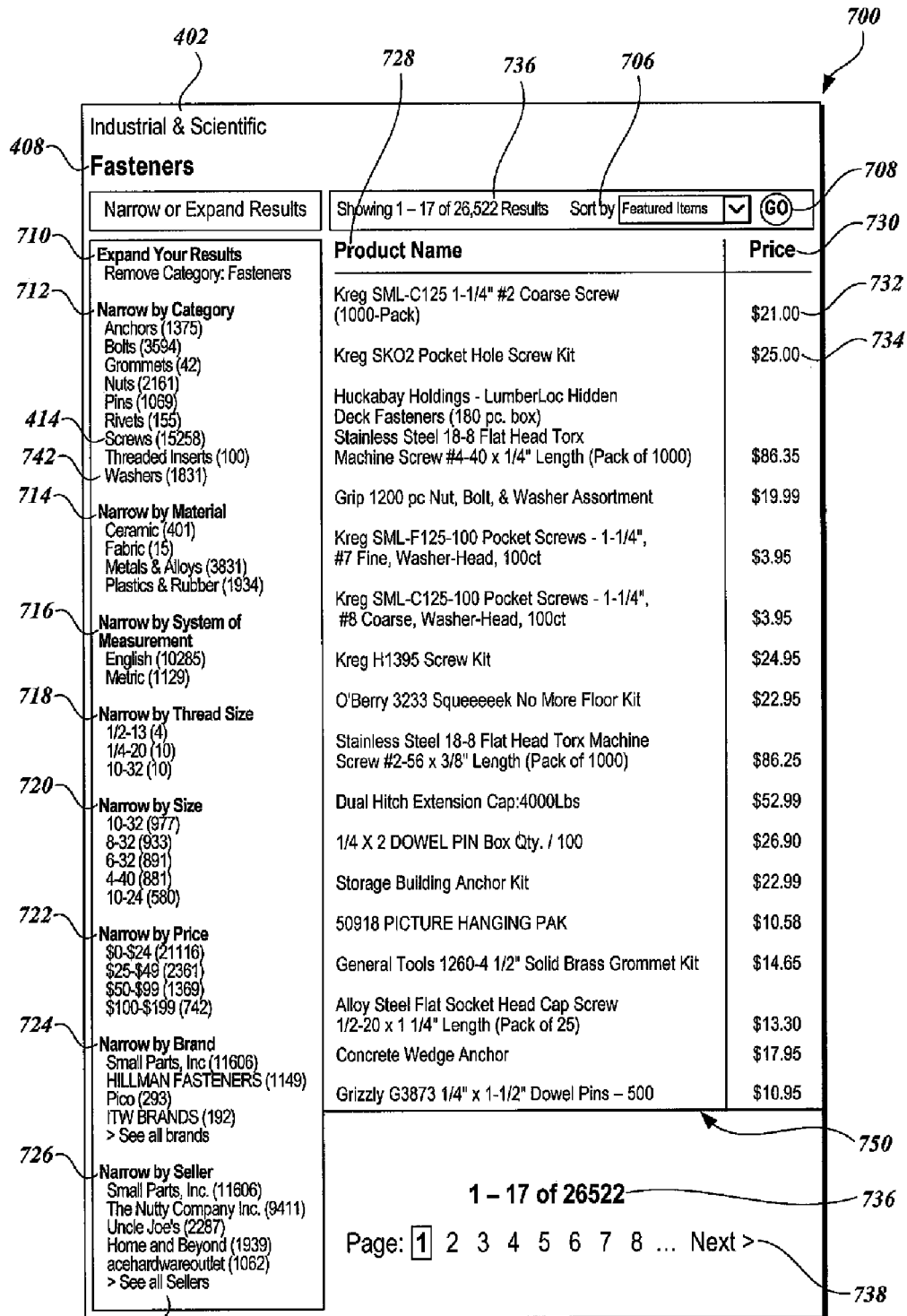
FIG. 7 is a pictorial diagram of a user interface display including a browse menu and an arrangement of attributes corresponding to a "Fasteners" browse node.
Figure 8:
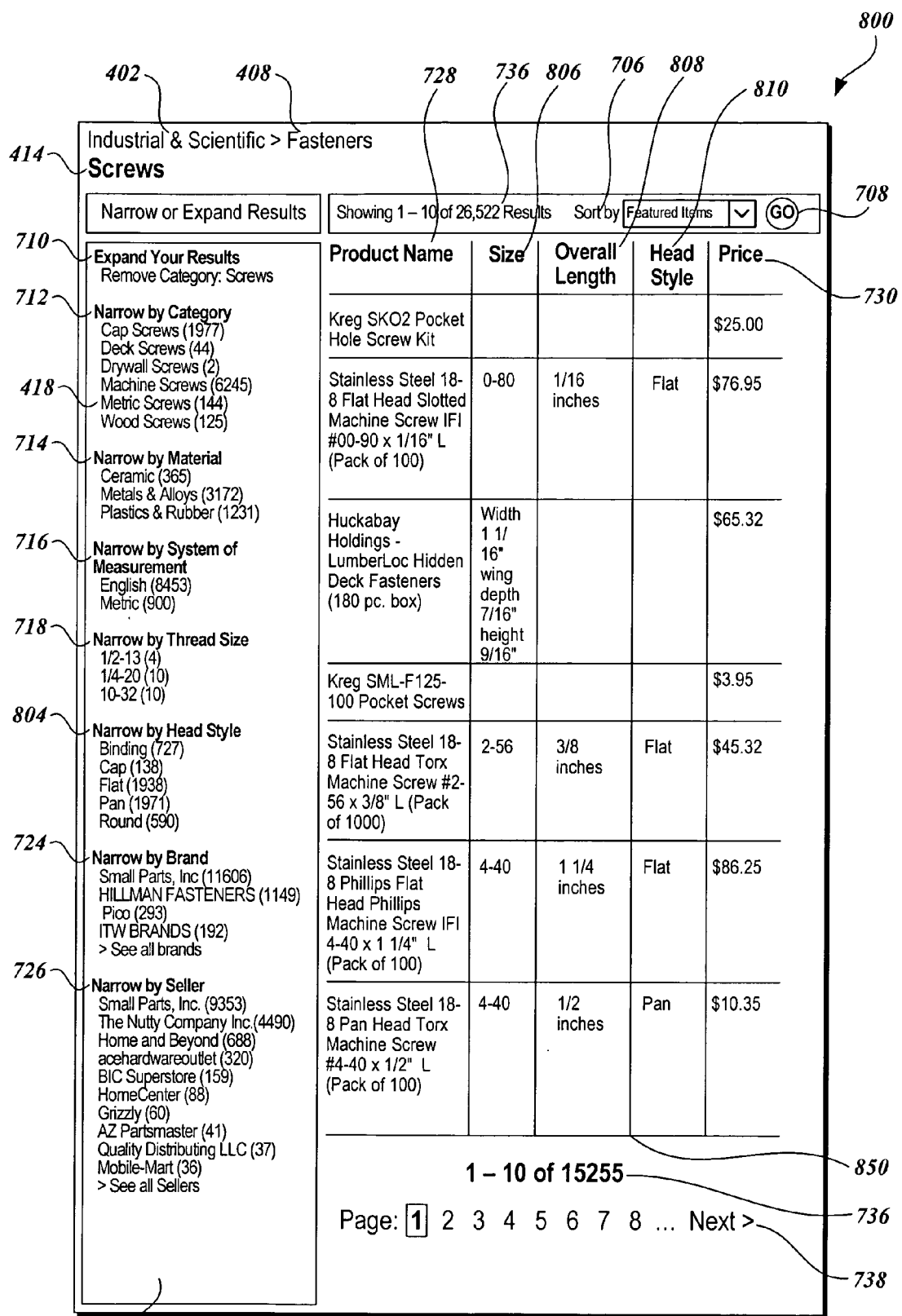
FIG. 8 is a pictorial diagram of a user interface display including a browse menu and an arrangement of attributes corresponding to a "Screws" browse node.

For example and with reference to FIG. 7, the user may have selected a browse node for a "Screws" sub-category of the category "Fasteners" by clicking the hyperlink for the "Screws" browse node 414 in Web page 700. In response, the server issues a query to the data store 102 for data regarding the items categorized in the "Screws" browse node, including the attributes corresponding to the "Screws" browse node. In response to the query, the data store 102 provides the data including the corresponding attributes to the server 104. As discussed in more detail below, the browse node attributes can be customized for display according to clickstream analysis, other learning techniques, and/or user or group preferences. This customization can be performed by the server 104 or by code on the client device 108. Once the server 104 obtains the attributes corresponding to the second browse node from the data store 102, the server 104 transmits data regarding the items in the second browse node, including the attributes corresponding to the second browse node, to the client device 108 via the communications network 106. The user-interface component 110 of the client device 108 processes the data to construct a user interface, such as a Web page, that displays the items categorized in the second browse node and the associated browse node attributes. Such a Web page is illustrated in FIG. 8, which is described in more detail below.

Figure 3:
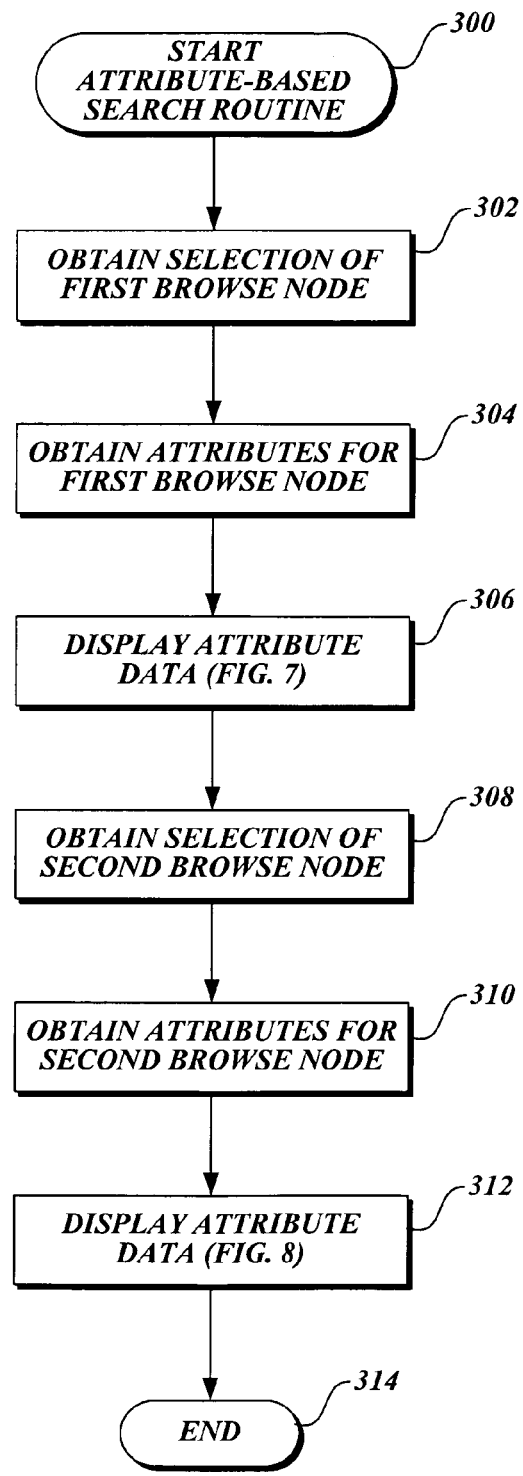
FIG. 3 is a flow diagram of a sample attribute-based search routine implemented by the client device shown in FIG. 1.

With reference now to FIG. 3, a flow diagram illustrative of a sample attribute-based search routine implemented by the client device 108 will be described. At block 302, a selection of a first browse node is obtained from a user. As explained above, a user can select a first browse node by clicking a hyperlink associated with the browse node on a Web page. For example, referring to FIG. 6, a user can select the "Fasteners" browse node 408 by clicking on an associated hyperlink. At block 304, data associated with the first browse node, including corresponding attributes, are obtained from the data store 102. More specifically, in one embodiment, the client device 108 transmits a request for browse node data including corresponding attributes to the server 104 via the network 106. In response, the server 104 returns the browse node data including corresponding attributes. At block 306, the client device 108 processes the data and constructs a user interface, such as a Web page, that displays the items categorized in the first browse node and the associated browse node attributes. Continuing with the example above, if the user has selected the "Fasteners" browse node 408, then the client device 108 displays a Web page 700 as depicted in FIG. 7 that includes an item attribute table 750 in which the items categorized in the "Fasteners" browse node and the attributes "Product Name" 728 and "Price" 730 associated with the "Fasteners" browse node are displayed. As shown in FIG. 7, the data for each of these respective attributes is displayed in the item attribute table 750 in column format under the headings "Product Name" and "Price." FIG. 7 will be described in more detail below.

At block 308, a selection of a second browse node, i.e., a child node of the first or "parent" node can be obtained from a user. As described below, a user can select a second browse node by clicking a hyperlink associated with a browse node in a Web page. For example, referring to FIG. 7, a user can select the "Screws" browse node 414 wherein the "Screws" browse node is a child node of the "Fasteners" browse node 408, and thus, represents a sub-category of the "Fasteners" category. In the illustrated embodiment, the "Screws" browse node 7414 can appear as a hyperlink within the Web page 700 corresponding to the "Fasteners" browse node. At block 310 attributes corresponding to the second browse node are obtained. For example, the client device 108 transmits a request to the server 104 for browse node data, including attributes corresponding to the second browse node. In response, the server 104 transmits the corresponding attributes to the client device 108. At block 312, the attributes corresponding to the second browse node are displayed. Continuing with the example above, if the user has selected the "Screws" browse node 7414, then the client device 108 displays a Web page 800 as depicted in FIG. 8 that includes an item attribute table 850 in which the items categorized in the "Screws" browse node and the attributes, e.g., "Size," "Head Style," etc. associated therewith are displayed. As shown in FIG. 8, the specific data for each of these respective attributes is displayed in the item attribute table 850 in column format under the headings "Product Name," "Size," etc. FIG. 8 will be described in-more detail below. At block 314, the attribute-based search routine ends. Although, flow chart 300 only depicts the selection and display of attribute data corresponding to a first and second browse node, it will be appreciated that a user can navigate through any number of browse nodes within the browse tree and at any depth in the browse tree until an ultimate leaf node is found.

Figure 4:
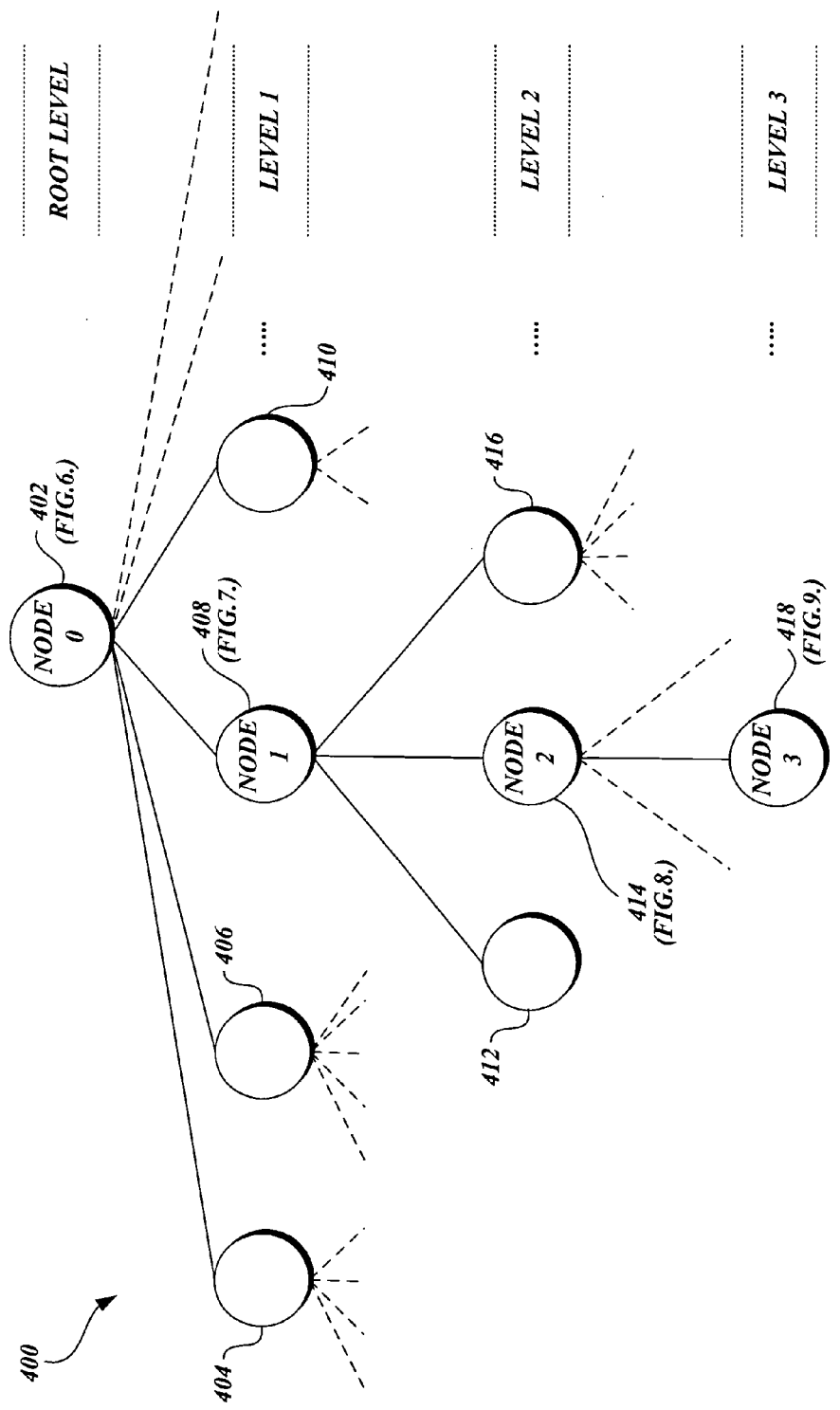
FIG. 4 is a block diagram of a sample tree-structure representing a hierarchical arrangement of browse nodes formed in accordance with an aspect of the present invention.

With reference now to FIG. 4, a browse tree-structure 400 representative of a hierarchical arrangement of browse nodes will be described in more detail. An illustrative arrangement of browse nodes may contain four levels. However, it will be appreciated by one skilled in the art that an arrangement of browse nodes can span any number of levels. The root level of the tree structure may correspond to a single browse node 402 representing all or a subset of items in an electronic catalog. Further, in the illustrated embodiment, each browse node can be displayed in a Web page. For example, the items categorized in browse node 402 associated with the "Industrial & Scientific" category are displayed in Web page 600 depicted in FIG. 6. However, in other embodiments, the browse node may be displayed in another type of user interface. For example, items categorized in a browse node may be displayed in different menus or may be delivered as voice prompts within a telephonic prompting system. Accordingly, any type of system which facilitates user interaction can be used.

In the illustrated embodiment, to reach a browse node on Level One, a user can select a hyperlink associated with a Level One child node from a Web page or other user interface associated with the root-level browse node. For example, the contents of the Industrial & Scientific 402 browse node are displayed in Web page 600 depicted in FIG. 6. Accordingly, hyperlinks to each of the Level One child nodes are displayed in Web page 600. A user can then select a hyperlink corresponding to the "Fasteners" browse node 408 which in turn causes the Web page 700 depicted in FIG. 7 to be displayed. In the illustrated embodiment, there are several browse nodes 404, 406, 408, and 410 within Level One of the tree structure. As will be described in more detail below, each of the Level One browse nodes 404, 406, 408, and 410 may have associated attributes that are common to all of the items of browse node. For example, FIG. 7 depicts sample attributes, such as "Product Name" 728 and "Price" 730, which are common across all fasteners. If another link to a Level One browse node had been selected, such as the "springs" link 612, a different set of attributes may be displayed if the attributes common to all springs are different than the attributes common to fasteners.

Referring again to FIG. 4, a user can select a hyperlink to a Level Two browse node from within a Level One browse node. For example, from the illustrative Web page 700 depicted in FIG. 7, a user can select a hyperlink corresponding to the "Screws" browse node 414, which in turn causes Web page 800 depicted in FIG. 8 to be displayed. In the illustrated embodiment, there are several browse nodes 412, 414, and 416 within Level Two of the tree structure. As will be described in more detail below, each of the level two browse nodes 412, 414, and 416 may have associated attributes that are common to all of the items of the Level Two browse node. In addition, each of the Level Two browse nodes may inherit the attributes associated with each of their respective parent, Level One nodes. For example, browse node 414 can correspond to the "Screws" browse node and can be associated with attributes for "Screws." Accordingly, when the Web page 800 associated with the "Screws" browse node 414 is displayed, the attributes "Product Name" 728 and "Price" 730 inherited from the parent, Level One browse node for the "Fasteners" category are also displayed in connection with each item that falls within the "Screws" sub-category. One or more additional attributes common to "Screws" may also be displayed. Accordingly, in the illustrated embodiment, attributes such as "Size" 806, "Overall Length" 808, "Head Style" 810, and "Price" 730 are also displayed in connection with each item in the "Screws" sub-category. If a hyperlink to a different level two browse node had been selected, such as the "washers" browse node 742, a different set of attributes that was common to washers may have been displayed.

If a user desires to narrow his/her search even further, the user may select a hyperlink to a Level Three browse node. For example, a user can select a hyperlink corresponding to the "Metric Screws" browse node 418 in Web page 800, which in turn causes Web page 900 depicted in FIG. 9 to be displayed. In the illustrated embodiment, the "Metric Screws" browse node 418 may correspond to a Level Three leaf node 418 in FIG. 4 which allows no further narrowing. Similar to the Level One and Two nodes, each Level Three node 418 may have associated attributes that are common to all of the items of the browse node. In addition, each of the level three nodes may inherit the attributes of their respective parent, Level Two nodes (who, in turn, had inherited the attributes of their respective parent Level One node). For example, level three browse node 418 may correspond to the "Metric Screws" browse node and can be associated with the attributes for "Metric Screws." Accordingly, when the Web page 900 associated with the "Metric Screws" browse node is displayed, the attributes "Price" 730, "Product Name" 728, "Size" 806, "Overall Length" 808, and "Head Style" 810 inherited from the parent, level two browse node for "Screws" are also displayed in an item attribute table 950. One or more additional attributes common to "Metric Screws," such as "Thread Pitch" 906, may also be displayed in item attribute table 950. Although FIG. 4 depicts only a single tree structure, it will be appreciated by one skilled in the art that multiple browse node trees may be stored in the data store 102.

In some embodiments, a user may be interested in items having a particular attribute and thus, may wish to see only those items having the particular attribute. For example and as is known in the art, a user interested in the Head Style attribute "Flat" could narrow his/her search further by selecting a hyperlink associated with the "Flat" Head Style attribute 912 from the browse menu 948. Although not shown, those skilled in the art will appreciate that if the hyperlink associated with the "Flat" Head Style attribute 912 were selected, then only those metric screws with a flat head style would be displayed in the item attribute table. Moreover, the "Head Style" attribute 810 would continue to be displayed in the item attribute table, even though all of the entries in the column under the heading "Head Style" would include the redundant and now unnecessary term "Flat." In addition, to view other Head Style attributes, the user would typically navigate back to a previous Web page and select a link corresponding to a different Head Style attribute.

In contrast, in one embodiment of the invention disclosed herein, each attribute with which the user could narrow his/her search is also associated in the browse menu 948 with a checkbox 910 that is selectable by the user. By selecting a checkbox corresponding to an attribute, the user may dynamically add and delete attributes of particular interest to the item attribute table 950 without requiring the user to return to previous Web pages and/or narrow search results in a serial fashion. For example, if the user selects checkbox 910A associated with the Head Style attribute "Flat" as shown in FIG. 10, then only those items with a flat head style are further depicted in the item attribute table 1050. However, the column with the heading "Head Style" is removed from the item attribute table 1050 in Web page 1000 depicted in FIG. 10, while a column with the heading "Drive Style" is added, because the "Drive Style" attribute 1004 is an attribute common to all flat head metric screws. As will be described in more detail below in connection with FIGS. 10 and 11, the user may select more than one attribute for display in the item attribute table. For example, both the "Flat" and "Oval" Head Style attributes may be selected simultaneously by the user and displayed in a resulting item attribute table. This is in contrast to known art in which a user could only narrow his/her search by selecting only one attribute at a time.

Figure 5:
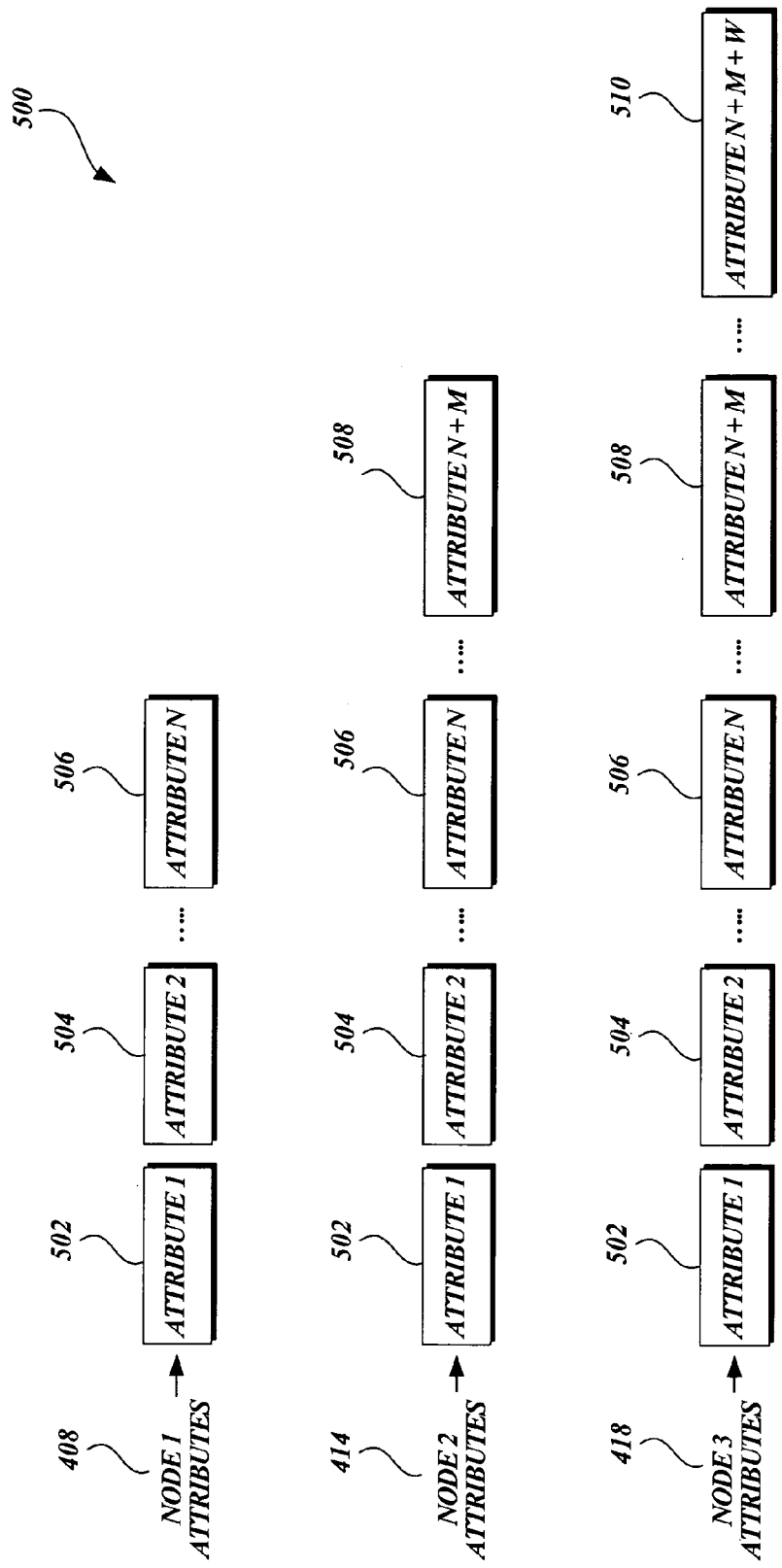
FIG. 5 is a block diagram depicting the inheritance of attribute data in a child node from a parent node in the tree shown in FIG. 4.

With reference now to FIG. 5, attribute data 500 corresponding to various browse nodes of the browse node tree 400 will be described. Node 1 408 from Level One of the browse tree 400 can include a first attribute 502, a second attribute 504, and on up to an Nth attribute 506. It will be appreciated that there is no limit to the number of attributes that can be associated with a browse node. Node 2 414 from Level Two of the browse tree 400 inherits the first N attributes common to node 1 408, and also includes attributes up to and including an N+Mth attribute 508. Thus, there can be more attributes associated with node 2 414 than are associated with node 1 408. Node 3 418 from Level Three of the browse tree 408 inherits the first N attributes common to node 1 408, the first N+Mth attributes 508 common to node 2 414, and also includes attributes up to and including an N+M+Wth attribute 510. Thus, there can be more attributes associated with node 3 414 than are associated with either node 1 408 or node 2 414. It will be appreciated that as a user continues to narrow his or her search by selecting browse nodes at lower and lower levels of the browse tree, the number of attributes displayed will increase because there are more common characteristics amongst products in the narrower sub-categories. Furthermore, although navigation was described with reference from going from one level to the next lower level, in some embodiments, nodes on a certain level or levels could be skipped. In addition, if more than one browse tree exists, a user may navigate from one browse tree to another. In such cases, the attributes from the browse node from which the user navigated may be displayed along with the attributes of the browse node to which the user has navigated.

Attributes corresponding to a browse node can be static or dynamic. If the attribute is static, each user accessing the node will see the same attributes. If the attribute is dynamic, each user accessing the node may see different attributes. For example, clickstream analysis can be used to customize the attributes according to a user's browsing habits. For example, browse node attributes may be determined based on clickstream analysis or other learning techniques. As will be appreciated by one skilled in the art, a clickstream is a path a user takes while browsing a Web site. Each distinct selection made on a Web page adds one click to the stream. Accordingly, analysis of clickstream data may reveal which attributes a user more commonly associates with a category. For example, if the category is "Screws," possible attributes may include "Thread Size" and "Material." Further, narrowing of the types of products displayed can occur when a user chooses to narrow according to a specific attribute. By using clickstream analysis, it may be determined that users choose to narrow according to "Thread Size" significantly more than they choose to narrow according to "Material." Thus, because "Thread Size" appears to be a much more important attribute than "Material," the system 100 may choose to remove or to not display the "Material" attribute. Alternatively, the "Thread Size" attributes could be displayed more prominently on the display. This technique may be useful if the number of appropriate attributes is larger than the number of attributes that can be displayed on a user interface.

Other learning techniques can be used to determine which attributes to display. For example, instead of displaying attributes based on the browsing behavior of all users, attribute data can be displayed according to the preferences or characteristics of a single user or group of users. The user or group of users can be tracked to determine which attributes they would most like to view. Alternatively, the user or group of users can choose which attributes the user or group of users would like to view. Furthermore, a user can choose to prioritize the display of attributes. For example, a user may choose to have a "Thread Size" attribute displayed before a "Material" attribute. Display of attributes based on clickstream analysis and other learning techniques will be described in more detail below.

If a user always narrows based on the same attributes, other attributes that appear to be less interesting to the user can be hidden from view or not retrieved from the data store 102. Furthermore, attribute data can be customized according to the type of browsing device or the type of display device. For example, a user browsing attribute data over a mobile phone may only be able to see a subset of the attribute data that is available. Thus, few attributes may be displayed to a user browsing with client device 108 that is a mobile phone. Likewise, if a user has a small display, fewer attributes may be displayed. Various colors can also be used to draw attention to or away from certain attributes.

With reference now to FIG. 6, a Web page 600 corresponding to a browse node at the root level of the browse tree 400 (i.e., the Industrial & Scientific browse node 402) will be described. The illustrative Web page 600 can include a browse menu 648 with several item categories in the browse tree structure 400. For example, the browse menu can include categories corresponding to "Metals" 602, "Plastics" 604, "Mechanical Components" 606, "Fasteners" 408, Wire" 610, "Springs" 612, and "Tools and Safety" 614. Each item category can further include subcategories that allow a user to narrow his or her search to more specific categories. For example, "Metals" 602 includes sub-nodes representing sub-categories for "Metal Tubing," "Metal Balls," and "Metal Mesh." By clicking on one of the sub-nodes, a user can narrow his or her search to the more specific type of sub-category. This allows the user to quickly locate the specific type of item for which he or she is looking. In addition to the browse menu 648, the illustrative user interface 600 can include illustrations that correspond to the different types of categories. For example, the "Metals" browse node 602 can correspond to illustration 620. Likewise, the "Plastics" browse node 604 can correspond to illustration 622. Further, the "Fasteners" browse node 608 can correspond to illustration 624. The "Mechanical Components" browse node 606 can correspond to illustration 632. Additionally, categories within the browse menu 648 can be grouped into a single category or browse node. For example, "Wire" 610 and "Springs" 612 can be grouped into a single "Wire and Springs" browse node 640. The "Wire and Springs" browse node 640 can correspond to illustration 634. Further, the "Tools and Safety" browse node 614 can correspond to illustration 636. In the illustrated embodiment, the root level browse node corresponds to the broad category of "Industrial and Scientific" material 402. The "Industrial and Scientific" category 402 can correspond to illustration 618.

In the illustrated embodiment, user interface 600 is implemented within a Web page. Alternatively, user interface 600 can be implemented within a stand-alone application or within any other type of interactive medium. Further, the browse nodes displayed to a user can be customized based on certain criteria. For example, if click-stream analysis determines that a certain user visits the metals and plastics browse nodes more often than others within the "Industrial & Scientific" node, then these browse nodes can be displayed at the top of the Web page. Similarly, if a user never visits certain browse nodes, these can be hidden from the user's display. Furthermore, a user can customize the Web page according to his or her own preferences. For example, the user could select which browse nodes he or she desires to see within the "Industrial & Scientific" node. A user's preferences can be persisted throughout a session or can be saved such that the user has a consistent experience with each visit. Additionally, searches can be bookmarked for future use. For example, recent item purchases can be bookmarked for easy access by the user on future visits.

FIG. 7 depicts illustrative Web page 700 which is displayed after a user has selected the "Fasteners" browse node 408. The "Fasteners" browse node 408 can correspond to a browse node 408 on Level One of the browse tree 400, as depicted in FIG. 4. Accordingly, attributes "Product Name" 728 and "Price" 730 associated with the "Fasteners" browse node 408 are displayed in the item attribute table 740 for each item that falls within the "Fasteners" category. In the illustrated embodiment, these attributes are those that are common across all fasteners. For example, a "Fastener" item 732 with the product name "Kreg SML-C125" and a price of $21.00 is displayed. It will be appreciated by those skilled in the art that any number of items found in the category associated with the browse node can be displayed on the Web page 600. Furthermore, if there are more items than can be displayed in a single Web page 700, then the items can be displayed across multiple pages 738. The Web page 700 can also include the current number of items displayed and the total number of items available 736. The Web page 700 corresponding to the "Fasteners" browse node 408 may also include a browse menu 748. The browse menu 748 can include several hyperlinks that allow a user to narrow his or her search. Additionally, hyperlinks can be included that allow a user to expand the search. For example, if a user wishes to expand back to the "Industrial & Scientific" browse node 402, then the user can click on the hyperlink 710. If the user wishes to narrow the search by category, the user can click on the hyperlink 712. Likewise, if a user wishes to narrow by criteria such as the type of material, the user can click on the hyperlink 714. Further, if the user wishes to narrow by system of measurement, the user can click on the hyperlink 716. If the user desires to narrow by thread size, the user can click on hyperlink 718. If the user wishes to narrow by size, the user can click on hyperlink 720. Likewise, if the user wishes to narrow by price, the user can click on hyperlink 722. If the user wishes to narrow by brand, the user can click on hyperlink 724. Similarly, if the user wishes to narrow by seller, the user can click on hyperlink 726. Accordingly, each of the narrowing criteria within the browse menu 748 can include sub-categories or sub-criteria that allow the user to narrow the search even further. For example, if the user desires to go directly to the "Screws" sub-category or browse node 414, the user can click on the hyperlink associated therewith. It will be appreciated by one skilled in the art that any number of narrowing categories or criteria can be included within the browse menu 748. Likewise, the narrowing categories or criteria within the browse menu 748 can include any number of sub-categories or sub-criteria. In addition to the browse menu 748, illustrative Web page 700 can include a sorting mechanism 706. For example, a user could choose to sort the results shown in Web page 700 by featured items. When the user clicks control 708, the items would appear in a sorted manner. In addition to displaying attributes in text, illustrations can also be used in addition to or in place of the text description.

Although FIG. 7 depicts the attributes that are common to the "Fasteners" browse node 408, it will be appreciated that if a user were to select a different browse node, such as the "Metals" browse node 602, attributes common to metals would be displayed. For example, if the "Metals" browse node 602 had been selected, attributes common to metals, such as temper and hardness, could be displayed. Further, each attribute can be displayed as a hyperlink. For example, the product name "Kreg SML-C125" corresponding to "Fastener" item 732 can be displayed as a hyperlink. Similarly, the price "$21.00" corresponding to "Fastener" item 732 can be displayed as a hyperlink. The hyperlink can add the item to the user's shopping cart or take the user to a page describing the item in more detail.

FIG. 8 depicts the illustrative Web page 800 which is displayed after a user has selected to narrow the search results displayed in Web page 700 by selecting the "Screws" browse node 414. The "Screws" browse node 414 can include the attributes of "Product Name" 728, "Size" 806, "Overall Length" 808, "Head Style" 810, and "Price" 730, which are common across the screws found in browse node 414. Thus, these attributes are displayed in the item attribute table 830. As discussed above, each child node can inherit the attributes from the parent node. Thus, the "Product Name" attribute 728 and the "Price" attribute 730 are inherited from the "Fasteners" browse node 408. The "Size" attribute 806, the "Overall Length" attribute 808, and the "Head Style" attribute 810 are new attributes specific to the "Screws" browse node 414. These new attributes are those that may be applicable to all screws, but not to all fasteners. Similar to the Web page 700, the browse menu 848 in the Web page 800 includes narrowing criteria and categories. Further, the browse menu 848 includes new narrowing criteria, such as the "Head Style" 804 criterion. Additionally, the browse menu 848 allows a user to expand the user's search by removing the "Screws" category 414.

FIG. 9 depicts an illustrative Web page which is displayed after a user has selected to narrow the search results displayed in Web page 800 by selecting "Metric Screws" browse node 418. The "Metric Screws" browse node 418 can include the attributes of "Product Name" 728, "Size" 806, "Overall Length" 808, "Head Style" 810, and "Price" 730. Accordingly, these attributes may be displayed in the item attribute table 850. Additionally, a new "Thread Pitch" attribute 906 can be displayed in the item attribute table 850. The new attribute is an attribute common to all metric screws, but not common to all screws or fasteners. As discussed above, the "Metric Screws" browse node 418 can inherit attributes from the "Screws" browse node, i.e., its parent node. Thus, the "Product Name" attribute 728, "Size" attribute 806, "Overall Length" attribute 808, "Head Style" attribute 810, and "Price" attribute 730 can be inherited from the "Screws" browse node 414. A browse menu 948 in the Web page 900 may include further elements similar to that found on Web pages 700 and 800. However, in the illustrative embodiment depicted in FIG. 9, the browse menu 948 also includes a "See Only" option 908 selectable by the user. Although all of the attributes common to the "Metric Screws" browse node 418, i.e., "Product Name" 728, "Size" 806, "Overall Length" 808, "Head Style" 810, and "Price" 730, are displayed in the item attribute table 950 in Web page 900, those skilled in the art will appreciate that not all users may be interested in all of these attributes. Accordingly, the user may explicitly select which attributes he/she prefers to view in the item attribute table 950. In the illustrated embodiment, the user has selected all of the above-named attributes by selecting the checkbox 910 corresponding to each attribute. Accordingly, all such attributes are displayed in the item attribute table 950. However, as will be described in more detail below in connection with FIG. 11, the user may opt not to see one or more attributes in the item attribute table by unselecting a corresponding checkbox. Although in the illustrated embodiment checkboxes are used to enable selection by a user of particular attributes, those skilled in the art will appreciate that virtually any user interface command or control can be used to implement such functionality without departing from the spirit and scope of the present disclosure. In addition, those skilled in the art will recognize that the checkboxes in the illustrated embodiment implemented such that selection of a checkbox causes a corresponding attribute to be displayed or added to the item attribute table. However, in other embodiments, the checkboxes may be implemented such that selection causes a corresponding attribute to be removed from the item attribute table.

FIG. 10 depicts an illustrative Web page 1000, which is displayed after a user has selected a particular attribute of interest, e.g., by selecting checkbox 910A associated with the "Flat" Head Style attribute. Upon selection of checkbox 910A, only those items having a flat head style are displayed in the item attribute table 1050 of Web page 1000. In addition, the attribute "Head Style" 810, i.e., the column having the heading "Head Style" is removed from the item attribute table 1050. In addition, a new "Drive Style" attribute 1004, i.e., a column having the heading "Drive Style," is added to the item attribute table 1050. The new attribute is an attribute common to all metric screws having a flat head style, but not common to all screws or fasteners. Similar to the Web page 700, the browse menu 1048 in the Web page 1000 includes new narrowing criteria, i.e., the "Drive Style" 907 criterion.

In accordance with the above description, it is apparent that by selecting the checkbox 910A associated with the "Flat" Head Style attribute, the user can cause the arrangement of attributes in the item attribute table to dynamically change. For example, by selecting "Flat," the column having the heading "Head Style" 810 may be removed from the item attribute table 1050, while a new column having the heading "Drive Style" may be added.

Figure 11:
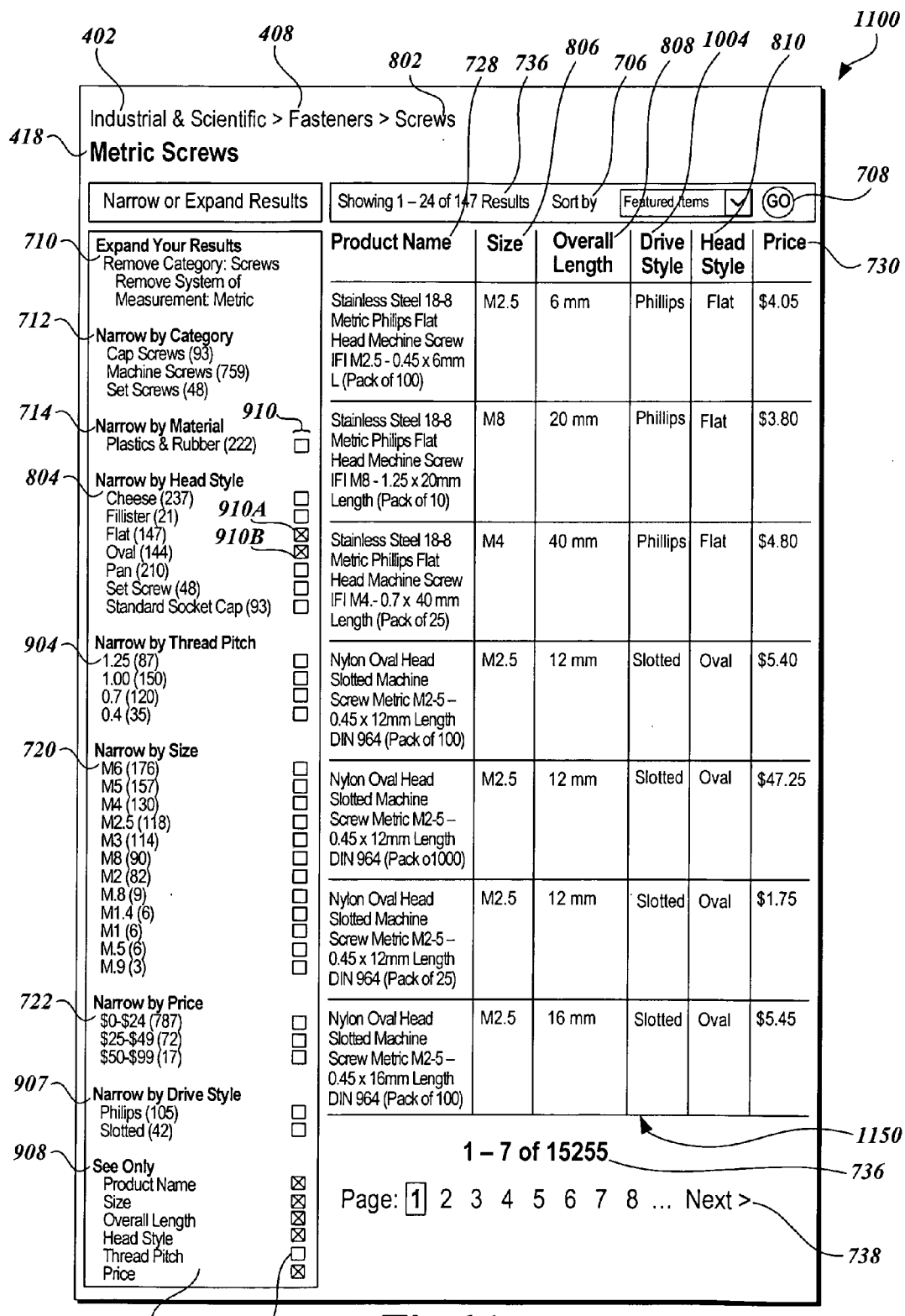
FIG. 11 is a pictorial diagram of a user interface display including a browse menu and an arrangement of attributes presented upon selection of more than one particular "Head Style" attribute shown in FIG. 10.

As depicted in FIG. 11, the user may simultaneously select more than one attribute and further alter the arrangement of attributes in the item attribute table. More specifically, as shown in FIG. 11, the user may select the checkbox 91 0A associated with the "Flat" Head Style attribute as well as the checkbox 910B associated with the "Oval" Head Style attribute. Accordingly, those metric screws with both a flat head style and an oval head style are displayed in the item attribute table 1150 of Web page 1100. Since more than one Head Style attribute is now relevant, the column with the heading "Head Style" returns to the item attribute table. In addition, the attributes "Product Name" 728, "Size" 806, "Overall Length" 808, "Drive Style" 1004, and "Price" 730 are also displayed. However, the column with the heading "Thread Pitch" is deleted from the item attribute table 1150 because the user has explicitly indicated that he/she is not interested in this attribute by unselecting the checkbox 910C associated with the attribute "Thread Pitch" in the "See Only" option 908 of the browse menu 1148. Accordingly, the user can cause the arrangement of attributes in the item attribute table to be dynamically changed by explicitly indicating an interest in particular attributes. In addition, the user may indicate interest in more than one attribute at a time.

Although FIGS. 7-11 have depicted the attributes as being displayed in columns, the attributes could also be arranged in rows or in any other configuration. Furthermore, a user can choose which attributes are to be displayed and the order of the display of the attributes. In addition, which attributes are to be displayed may be determined based on user preferences, clickstream data, or the type of device. The user preferences can be persisted throughout a session or persisted on a data store. Further, the user preferences can be stored as a bookmark for easy access by a user. For example, the user preferences can be stored as a bookmark accessible through a Web browser. Furthermore, the attributes displayed can be determined based on clickstream analysis from a single user, a group of users, or all users. For example, if, through click stream analysis, it is determined that a user rarely or never narrows a search based upon a certain attribute, then that attribute can be hidden from view or displayed less prominently. Additionally, color can be used to distinguish between often-used attributes and those that are used less. Other marking techniques can also be used to help a user distinguish between attributes. For example, different fonts or font sizes can be used. Further, italics, bolding, underlining or other marking techniques can be used.

While illustrative embodiments have been illustrated and described, it will be appreciated that various changes can be made therein without departing from the spirit and scope of the invention.

The invention claimed is:

1. A computer-implemented method for displaying information related to items categorized into a plurality of nodes logically arranged into a hierarchy, each item having at least one attribute associated with the item, the method comprising:

under control of instructions that are executed by one or more computing devices in a computer system:
receiving a request for a first node in the hierarchy, wherein a first set of attributes is associated with the first node, and wherein each attribute is common to the items categorized in the first node;
in response to receiving the request for the first node, generating display information for one or more items categorized in the first node together with at least one attribute of the first set of attributes;
receiving a request for a second node in the hierarchy, the second node being a child of the first node, wherein a second set of attributes is associated with the second node, and wherein each attribute of the second set is common to the items categorized in the second node;
in response to receiving the request for the second node, generating display information for one or more items categorized in the second node together with at least one attribute of the second set of attributes and at least one attribute of the first set of attributes;
receiving a request for an $n^{th}$ node in the hierarchy, the $n^{th}$ node being a child of an $n-1^{th}$ node, wherein an $n^{th}$ set of attributes is associated with the $n^{th}$ node, and wherein each attribute of the $n^{th}$ set is common to the items categorized in the $n^{th}$ node;
in response to receiving a request for the $n^{th}$ node, generating display information for one or more items categorized in the $n^{th}$ node together with at least one attribute of the $n^{th}$ set of attributes, at least one attribute of the second set of attributes, and at least one attribute of the first set of attributes; and
for each node,
displaying a list of selectable attributes arranged into attribute categories, each attribute category including a plurality of attributes associated with the category; and
in response to a selection of at least one attribute from an attribute category,
adding to the list of selectable attributes at least one additional attribute category, wherein the at least one additional category is associated with the attribute category from which the at least one attribute was selected, and
generating display information only for items associated with the at least one attribute that was selected, the display information including attributes associated with the at least one additional category,
wherein when two or more attributes are selected from the attribute category, the attribute category is included in the display information, and when only one attribute is selected from the attribute category, the attribute category is excluded from the display information.

2. The computer-implemented method of claim 1 further comprising receiving a user selection of which attributes in the first, second, and $n^{th}$ set of attributes are to be displayed.

3. A system for displaying items, the system comprising:
a data store storing a plurality of items categorized into nodes that are arranged into a parent-child hierarchical structure, wherein for a first node in the parent-child hierarchical structure, an attribute common to the items categorized in the first node is associated with the first node; and
a computing device configured to obtain the attribute from the data store in response to a request for the first node and to generate information for displaying each item categorized in the first node with the attribute common to the items categorized in the first node,
wherein the computing device is further configured to obtain an attribute from the data store in response to a request for an $n^{th}$ node in the hierarchical structure, wherein the attribute is common to the items categorized in the $n^{th}$ node, and to generate information for displaying each item categorized in the $n^{th}$ node with the attribute common to the items categorized in the $n^{th}$ node, and wherein the computing device is further configured, for each node, to:
- display a list of selectable attributes arranged into attribute categories, each attribute category including a plurality of attributes associated with the category; and
- in response to a selection of at least one attribute from an attribute category,
  - add to the list of selectable attributes at least one additional attribute category, wherein the at least one additional category is associated with the attribute category from which the at least one attribute was selected, and
  - generate display information only for items associated with the at least one attribute that was selected, the display information including attributes associated with the at least one additional category,
  - wherein when two or more attributes are selected from the attribute category, the attribute category is included in the display information, and when only one attribute is selected from the attribute category, the attribute category is excluded from the display information.

4. The system of claim 3, wherein for at least one node in the hierarchical structure, a plurality of attributes common to the items categorized in the first node are associated with the node.

5. The system of claim 4, wherein the computing device is configured to generate information for displaying the plurality of attributes based on a user preference.

6. The system of claim 4, wherein the computing device is configured to generate information for displaying the plurality of attributes based on an analysis of clickstream data.

7. The system of claim 4, wherein the computing device is configured to generate information for displaying the plurality of attributes based on the type of the computing device.

8. The system of claim 4, wherein the computing device is configured to generate information for displaying the plurality of attributes in a table.

9. The system of claim 8, wherein the computing device is configured to generate information for displaying one or more of the plurality of attributes in the table based on a selection of at least one attribute of interest.

10. The system of claim 9, wherein the computing device is configured to cause one or more of the plurality of attributes to be deleted from the table based on the selection of at least one attribute of interest.

11. The system of claim 9, wherein the computing device is configured to cause one or more of the plurality of attributes to be added to the table based on the selection of at least one attribute of interest.

12. The system of claim 3, wherein for a second node in the hierarchical structure stored in the data store, an attribute common to the items categorized in the second node is associated with the second node.

13. The system of claim 12, wherein the second node is a child of the first node, and wherein the attribute associated with the first node is also associated with the second node.

14. The system of claim 13, wherein in response to a request for the second node, the computing device is configured to obtain the attribute associated with the second node and the attribute associated with the first node and to generate information for displaying each item categorized in the second node with the attribute associated with the second node and the attribute associated with the first node.

15. The system of claim 3, wherein the attribute is static.

16. The system of claim 3, wherein the attribute is dynamic.

17. The system of claim 3, wherein each item categorized in the first node is displayed with the attribute common to the items categorized in the first node in accordance with the display information.

18. A computer-implemented method for electronically displaying information related to items categorized into a plurality of nodes logically arranged into a parent-child hierarchy, the method comprising:
- detecting a request for a first node in the parent-child hierarchy, wherein a first set of attributes is associated with the first node, and wherein each attribute of the first set is common to the items categorized in the first node;
- in response to the request for the first node, generating information for electronically displaying one or more items categorized in the first node together with at least one attribute of the first set of attributes;
- detecting a request for an $n^{th}$ node in the parent-child hierarchy, wherein an $n^{th}$ set of attributes is associated with the $n^{th}$ node, and wherein each attribute of the $n^{th}$ set is common to the items categorized in the $n^{th}$ node; and
- in response to the request for the $n^{th}$ node, generating information for electronically displaying one or more items categorized in the $n^{th}$ node together with at least one attribute of the $n^{th}$ set of attributes and at least one attribute of the first set of attributes; and
- for each node,
  - displaying a list of selectable attributes arranged into attribute categories, each attribute category including a plurality of attributes associated with the category; and
  - in response to a selection of at least one attribute from an attribute category,
    - adding to the list of selectable attributes at least one additional attribute category, wherein the at least one additional category is associated with the attribute category from which the at least one attribute was selected, and
    - generating display information only for items associated with the at least one attribute that was selected, the display information including attributes associated with the at least one additional category,
    - wherein when two or more attributes are selected from the attribute category, the attribute category is included in the display information, and when only one attribute is selected from the attribute category, the attribute category is excluded from the display information.

19. The computer-implemented method of claim 18 further comprising receiving a selection of which attributes of the first set of attributes are to be displayed together with the one or more items categorized in the first node.

20. The computer-implemented method of claim 18 further comprising:
- selecting a second node in the hierarchy, wherein a second set of attributes is associated with the second node, and wherein each attribute of the second set is common to the items categorized in the second node.

21. The computer-implemented method of claim 20 further comprising:
- generating information for displaying one or more items categorized in the second node together with at least one attribute of the second set of attributes and at least one attribute of the first set of attributes.

22. The computer-implemented method of claim 21 further comprising enabling selection of which attributes of the second set of attributes are to be displayed together with the one or more items categorized in the second node.

23. The computer-implemented method of claim 18 further comprising receiving a selection of which attributes of the $n^{th}$ set of attributes are to be displayed together with the one or more items categorized in the $n^{th}$ node.

24. The computer-implemented method of claim 18 further comprising configuring the display information for the at least one attribute of the first set based on clickstream data.

25. The computer-implemented method of claim 18 further comprising configuring the display information for the at least one attribute of the first set based on a user preference.

26. The computer-implemented method of claim 18 further comprising configuring the display information for the at least one attribute of the first set such that the at least one attribute is displayed in a user-selected order.

27. The computer-implemented method of claim 18 further comprising configuring the display information for the at least one attribute of the first set based on a client device causing the at least one attribute to be displayed.

28. The computer-implemented method of claim 18 further comprising electronically displaying the one or more items categorized in the first node together with at least one attribute of the first set of attributes in accordance with the display information.

29. A computer-readable medium having a computer-executable component for displaying items categorized into a hierarchy of nodes, wherein the hierarchy includes a parent node corresponding to a category of items and a child node corresponding to a sub-category of items, the computer-executable component comprising:
a user interface component for:
receiving a user selection of a child node in the hierarchy, wherein a first set of attributes is associated with the child node, wherein the first set of attributes is common to the items in the sub-category corresponding to the child node, and wherein the first set of attributes is a superset of attributes further including any attributes associated with the parent node;
in response to the user selection of the child node in the hierarchy, electronically displaying one or more items in the sub-category corresponding to the child node together with at least one attribute of the first set of attributes;
receiving a user selection of an $n^{th}$ node in the hierarchy, wherein an $n^{th}$ set of attributes is associated with the $n^{th}$ node, and wherein the $n^{th}$ set of attributes is common to the items in the sub-category corresponding to the $n^{th}$ node; and in response to the user selection of the $n^{th}$ node in the hierarchy electronically displaying one or more items in the sub-category corresponding to the $n^{th}$ node together with at least one attribute of the $n^{th}$ set of attributes and at least one attribute of the first set of attributes; and
for each node,
displaying a list of selectable attributes arranged into attribute categories, each attribute category including a plurality of attributes associated with the category; and
in response to a selection of at least one attribute from an attribute category,
adding to the list of selectable attributes at least one additional attribute category, wherein the at least one additional category is associated with the attribute category from which the at least one attribute was selected, and
generating display information only for items associated with the at least one attribute that was selected, the display information including attributes associated with the at least one additional category,
wherein when two or more attributes are selected from the attribute category, the attribute category is included in the display information, and when only one attribute is selected from the attribute category, the attribute category is excluded from the display information.

30. The computer-readable medium of claim 29, wherein the at least one attribute of the first set is a static attribute.

31. The computer-readable medium of claim 29, wherein the at least one attribute of the first set is a dynamic attribute.

32. The computer-readable medium of claim 29, wherein display of the at least one attribute of the first set is configured based on clickstream data.

33. The computer-readable medium of claim 29, wherein display of the at least one attribute of the first set is configured based on a user preference.

34. The computer-readable medium of claim 29, wherein display of the at least one attribute of the first set is configured based on a device executing the user interface component.

35. The computer-readable medium of claim 29, wherein the user interface component is further configured to receive a user selection of which attributes of the first set of attributes are to be displayed.

36. The computer-readable medium of claim 35, wherein the user interface component is further configured to receive a simultaneous selection of more than one attribute of the first set of attributes.

* * * * *

UNITED STATES PATENT AND TRADEMARK OFFICE
CERTIFICATE OF CORRECTION

PATENT NO. : 7,603,367 B1  Page 1 of 1
APPLICATION NO. : 11/540933
DATED : October 13, 2009
INVENTOR(S) : M. L. Kanter et al.

It is certified that error appears in the above-identified patent and that said Letters Patent is hereby corrected as shown below:

COLUMN  LINE

18  2  after "hierarchy" insert --,--
(Claim 29, line 26)

Signed and Sealed this

Nineteenth Day of January, 2010

David J. Kappos
*Director of the United States Patent and Trademark Office*